(12) United States Patent
Smith et al.

(10) Patent No.: US 6,283,851 B1
(45) Date of Patent: Sep. 4, 2001

(54) MAKE UP AIR EQUIPMENT CONTROL

(75) Inventors: Timothy John Smith, Minneapolis; Brad Alan Terlson, Maple Grove; Timothy John Kensok, Minnetonka, all of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/519,522

(22) Filed: Mar. 6, 2000

(51) Int. Cl.[7] ............................................. F24F 7/00
(52) U.S. Cl. ..................... 454/256; 454/255; 454/239
(58) Field of Search .................................. 454/255, 259, 454/338, 239, 238

(56) References Cited

U.S. PATENT DOCUMENTS

| | | | |
|---|---|---|---|
| 4,401,261 | * 8/1983 | Brown | 236/10 |
| 4,773,311 | * 9/1988 | Sharp | 454/238 |
| 5,131,887 | * 7/1992 | Traudt | 454/255 |
| 5,462,485 | * 10/1995 | Kinkead | 454/256 |
| 5,720,658 | * 2/1998 | Belusa | 454/238 |
| 5,846,128 | * 12/1998 | Kramer | 454/229 |

* cited by examiner

*Primary Examiner*—Harold Joyce
*Assistant Examiner*—Derek S. Boles
(74) *Attorney, Agent, or Firm*—Robert B. Leonard

(57) ABSTRACT

A system for controlling make-up air apparatus for a controlled building space includes a first sensor for sensing the operation of a first appliance within a building space. The appliance causes the air to be exhausted from the controlled building space. There is a controller which receives a first signal from the appliance indicating that the appliance is activated. This signal is used to determine the air flow requirements between the controlled building space and an environment outside of the controlled building space such as to ensure a predetermined balance of the pressure of air within the controlled building space and the environment outside of the controlled building space. An air temperature sensor monitors the outside temperature. A back-flow damper and a preheater are also associated with the make-up air apparatus. A switch activates the preheater in the event that the temperature of outside air is below a predetermined level. The motor of a blower causes air to be drawn into the building space. The motor speed is determined in response to appliance operation.

19 Claims, 5 Drawing Sheets

MAKE UP AIR EQUIPMENT CONTROL

RELATED APPLICATIONS

This invention relates the application Ser. No. 09/520,119 filed contemporaneously with the present application. The contents thereof are incorporated by reference.

BACKGROUND OF THE INVENTION

This invention relates to make-up air equipment. More specifically, this invention relates to equipment which provides make-up air and the control of such equipment.

Make-up air equipment supplies additional outside air to a building space. Make-up air is needed when an exhaust producing appliance within the building is operated. This make-up air equipment keeps the building from becoming depressurized. If depressurization of the building occurs, potentially dangerous situations may exist. Most importantly, spillage and back drafting of combustion by-products can occur—a very hazardous situation. This is generally true of all fossil fuel appliances like furnaces, water heaters, and wood burning equipment, etc.

In addition to the potentially hazardous situation mentioned above, an imbalance between the indoor and outdoor pressure can create uncomfortable conditions for the building occupants and can negatively impact the building structure. As is well known, air will move from spaces with a higher pressure to spaces with a lower pressure. Small openings in the building envelope allow for air to move through the wall to the lower pressure side. Depending on the indoor and outdoor temperature and dew point conditions, this may lead to condensation occurring within the wall and eventually to a degradation of the building structure. Imbalanced air pressures can also make doors and windows difficult to open and close and, in some cases prevent them from being held open or closed as desired. Consequently, it is desirable to utilize appropriate equipment to maintain indoor pressure equal to outdoor pressure.

Make-up air equipment generally consists of a fan and damper arrangement, sometimes utilizing a heater to condition outdoor air prior to delivery indoors. However, a control system does not presently exist for automatically adjusting the amount of make-up air to maintain neutral indoor air pressure (relative to outdoors). As a result, make-up air systems typically are manually controlled by simply turning a switch on or off. Such systems are often not turned on when needed, and do not respond to variable demand when, for example, multiple exhausting devices are used simultaneously. Other present make-up air systems may be interlocked with exhausting devices, but still lack the ability to respond to variable demand.

SUMMARY OF THE INVENTION

The invention is directed to providing a system and method for optimizing the control of makeup air systems. The invention would allow balanced airflow rates; namely the make up air volume brought inside the building would substantially equal the air volume exhausted from the building.

A control system for a make-up air apparatus (use in a controlled building space) includes a first sensor for sensing the operation of a first appliance within a building space. The appliance, when operational, causes air to be exhausted from the controlled building space. The first sensor for the make-up air apparatus communicates a first signal to a controller when the first appliance is activated. The controller can then use this information to control a make-up apparatus. A link allows the controller to render the make-up air apparatus operational when appropriate.

The control system monitors the air flow requirements between the controlled building space and an environment outside of the controlled building space such as to ensure a predetermined balance of the pressure of air within the controlled building space and the environment outside of the controlled building space. These airflow requirements are determined by monitoring each appliance within the controlled space which causes air to be exhausted. The make-up air apparatus includes a blower, a back-flow damper and a preheater to provide make-up air when necessary. Further, an air temperature monitor senses the outside air temperature and the preheater is activated at a predetermined temperature. A power supply activates a blower motor within the make-up air apparatus causing a blower to draw air into the building space. The motor speed and preheater operation is determined in response to at least one of the temperature data monitor and/or the pressure imbalance caused by the operation of at least one exhaust producing appliance.

In a preferred form of the invention there is a second sensor associated with a second appliance. The controller receives a second signal from the second sensor when the second appliance is operational. This indicates that the second appliance is withdrawing air from the controlled space. This information allows the control system to appropriately account for the effects of both the first and second appliance. Additionally, multiple sensors could be incorporated into the system, depending upon the number of exhaust producing appliances within the controlled space.

The appropriate motor speed is continually determined and adjusted, thereby adjusting the blower to regulate intake of air into the controlled building space. When an exhaust producing appliance is deactivated, a sensor associated with the appliance sends a signal to the control system. When all of the exhaust producing appliances within the controlled space are deactivated, the control system will deactivate the blower and preheater and close the back-flow damper. Alternatively, if at least one of the exhaust producing appliances continued to be operational, the make-up air apparatus would continue to operate.

In one form, the appliance is hardwired to the control system allowing the appliance to directly signal the control system regarding its operation. In another form a remote sensor such as a current sensor relay is used to determine the operational condition of the appliance. In this embodiment, the sensor is connected to the control system and is responsible for sending appropriate signals. In yet another form a wireless sensor is used. In this configuration, these wireless sensors (e.g. radio frequency (rf.) sensors) produce signals indicative of the appliance operation and relay these signals between an appliance and the control system.

It is the object of the present invention to provide control of make-up air by monitoring the operation of all exhaust producing appliances within a controlled space. This monitoring then allows control of the make-up air apparatus in order to provide a pressure balance in the controlled space.

It is a further object of the present invention to monitor the operation of a plurality of exhaust producing devices and appropriately control the make-up air system to react to variable levels of exhaust. That is, it is an object of the present invention to control make-up air in response to the operation of multiple exhaust producing devices, which will produce variable levels of exhaust.

The foregoing and other objects, features, and advantages of the present invention will be apparent from the following

BRIEF DESCRIPTION OF THE DRAWINGS

FIG. 3 represents a low voltage (24 Vac) design. The design is similar to FIG. 2, however a current sensing relay is used to determine when the exhaust appliance comes on.

DETAILED DESCRIPTION OF THE PREFERRED EMBODIMENT

Figure 1:
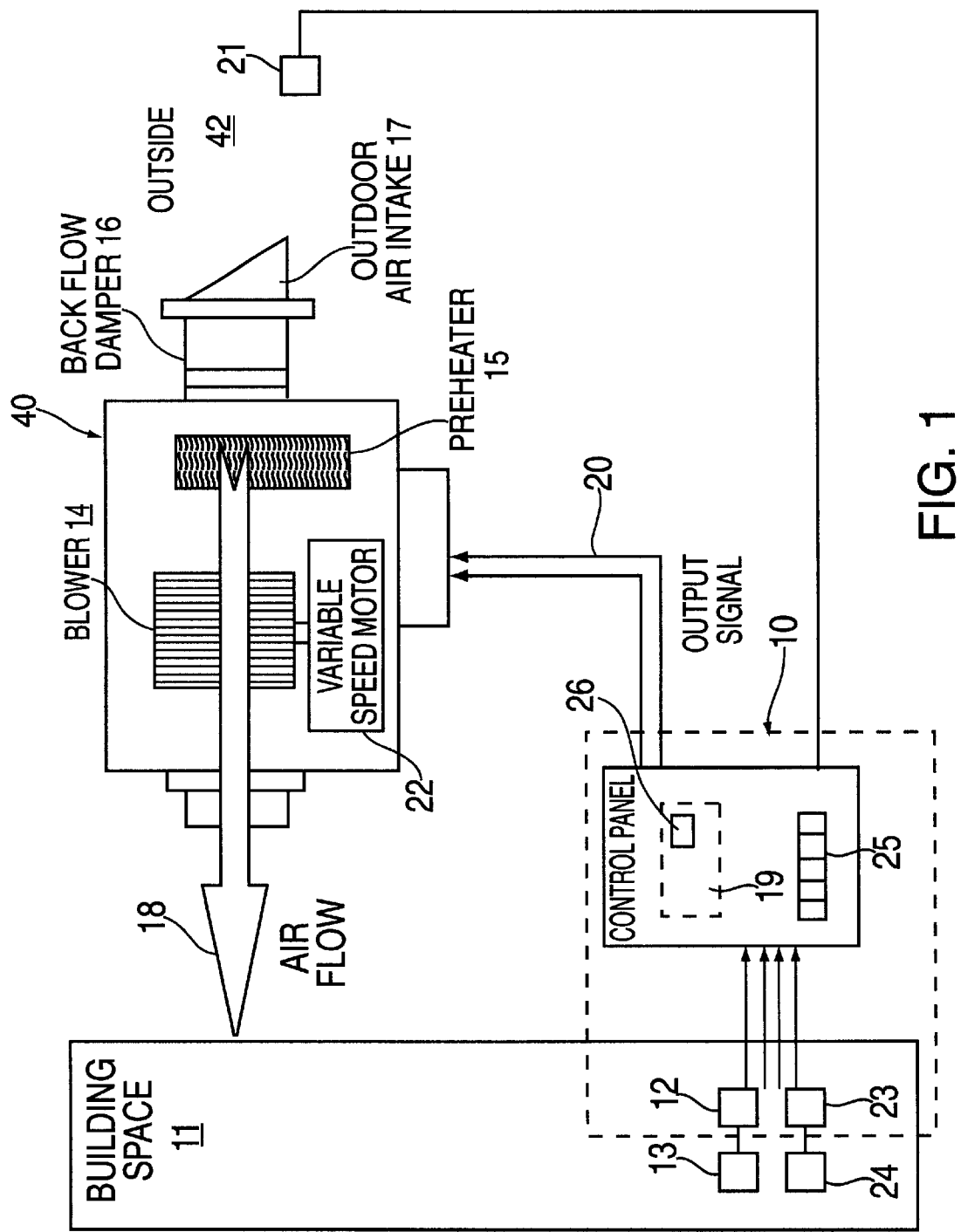
FIG. 1 illustrates the system, apparatus and equipment.

In the following description of the preferred embodiments reference is made to the accompanying drawings which form the part thereof, and in which are shown by way of illustration of specific embodiments in which the invention may be practiced. It is to be understood that other embodiments may be utilized and structural and functional changes may be made without departing from the scope of the present invention.

A control system 10 for controlling a make-up air apparatus 40 includes a first sensor 12 for sensing the operation of a first appliance 13 within the controlled building space 11. The make-up air apparatus 40 includes a blower fan 14, heater 15 and a back-flow damper 16. There is also an air intake 17 connected to the outside environment. The air flow 18 proceeds through the make-up air apparatus 40 into the controlled building space 11.

The appliance 13, when operational, causes air to be exhausted from the controlled building space 11. The appliance 13 may include any typical building system such as a furnace, water heater, wood burning equipment, exhaust fan, etc. Control system 10 receives a first signal from the sensor 12 indicating the operational status of the first appliance 13. If the first appliance 13 is activated, sensor 12 will thus create an appropriate signal indicating this. A link 20 acts to render the make-up air apparatus 40 operational when the first appliance 13 is activated.

Control system 10 monitors the air flow requirements between the controlled building space 11 and the outdoor environment 42 outside of the controlled building space 11 such as to ensure a predetermined balance of the pressure of air within the controlled building space 11 and the environment 42. This monitoring is accomplished by keeping track of the operation of the various appliances within the controlled building space.

As expected, the temperature of make-up air must be controlled to maintain comfort within controlled space 11. Blower 14 back-flow damper 16 and preheater 15 make up the functional components of the make-up air apparatus 40. An air temperature sensor 21 is also associated with control system 10 to monitor the outside air temperature. A switch activates the preheater 15 in the event that the temperature is below a predetermined level. Thus, overly cold air is not provided to the controlled space during operation of make-up air apparatus 40.

A variable speed motor 22 is included within make-up air apparatus 40 for operating blower 14. As previously mentioned, blower 14 causes air to be drawn into the controlled building space 11. Different types of blower control are possible. The motor speed is determined in response to the activation of at least one exhaust producing appliance. The pressure balance is determined by the controller in a variety of ways. For example, control system 10 may be preprogrammed to know exactly which appliances are being used, and to know what type of air displacement is occurring. Thus, when these appliances are activated, control system 10 knows exactly how much make-up air is required. Appropriate control signals can then be provided to make up air apparatus 40 (and specifically to variable speed motor 22).

A second sensor 23 is associated with a second appliance 24, and the control system 10, to provide a second signal which is indicative of the operational status of second appliance 24. Signals produced by second sensor 23 also indicate that air is being withdrawn by second appliance 24. Second sensor 23 allows control system 10 to appropriately account for this air withdrawn by second appliance 24 and appropriately control make-up air apparatus 40.

The motor speed 22 is adjusted to regulate the intake of air into the controlled building space as a result of the operation of one, two or more appliances. When an appliance 13 and 24 is deactivated, sensor 12 or 23 associated with the appliance sends a signal to the control system 10 to adjust the speed of blower 14. When all of the exhaust producing appliances are deactivated, control system 10 will deactivate blower 14, preheater 15 and close a back-flow damper 16. Consequently, no unnecessary make-up air is provided to the controlled space. This avoids over pressurizing a controlled space by having make-up air apparatus 40 run unnecessarily.

Figure 2:
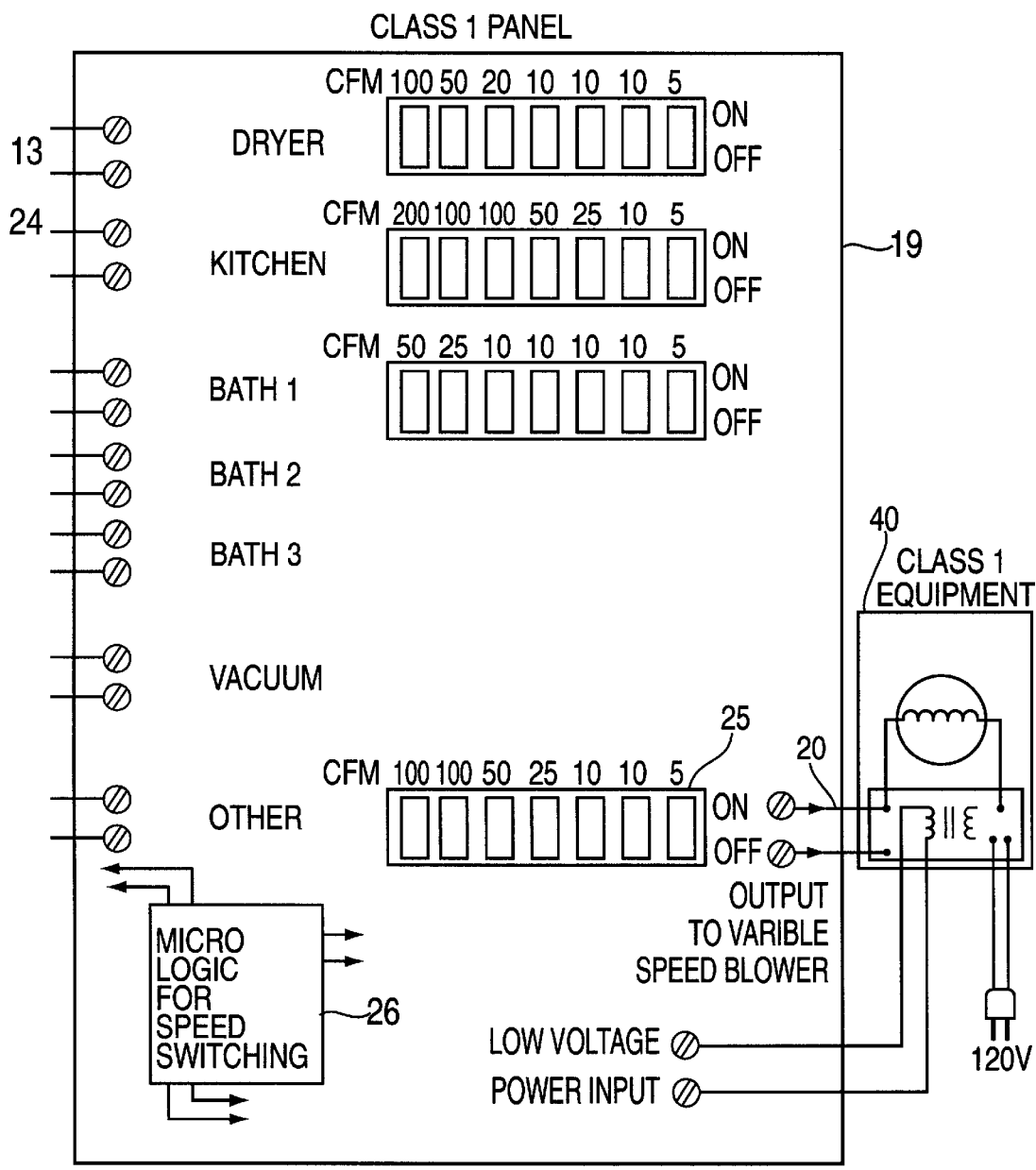
FIG. 2 represents a concept that requires each exhaust appliance to be wired directly (120 Vac) to the control panel.
Figure 3:
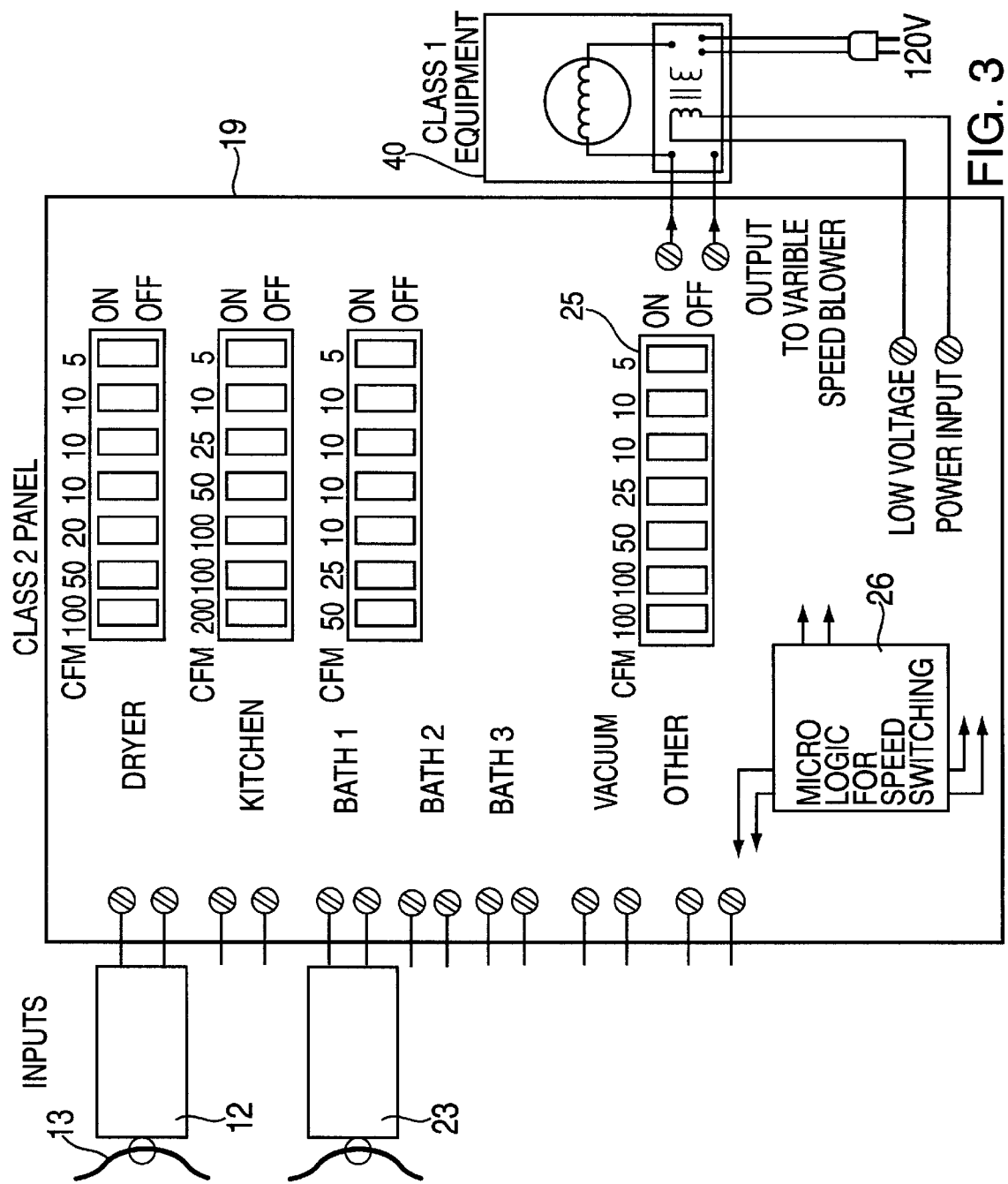
Figure 4:
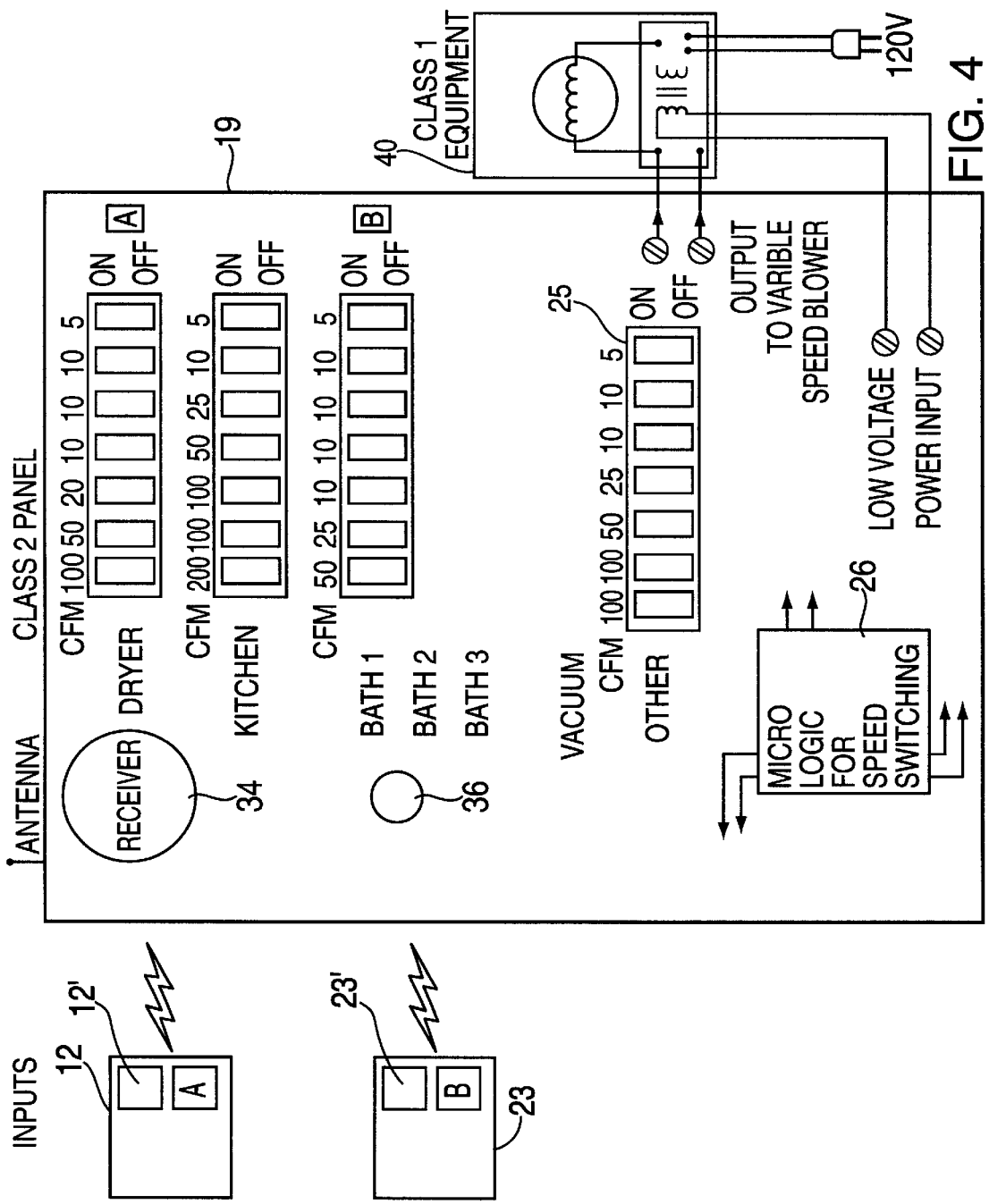
FIG. 4 shows a wireless signal concept that would use RF sensor technology to relay signals to the control panel.

Control system 10 includes an internal control panel 19, which has a microcontroller 26 or microprocessor attached thereto. Multiple possibilities exist for the design of control panel 19. Three design ideas are shown in FIGS. 2–4. The appliances can be hardwired to the control panel 19, and the operation of the appliance 13 or 24 directly signals the controller 19. (FIG. 2.) There can additionally or alternatively be a connection to a current sensor 12 or 23 to determine the operational condition of the appliance 13 or 24. (FIG. 3.) The sensor 12 or 23 sends a signal to the control panel 19. A wireless rf sensor 12 or 23 for relaying signals between an appliance 13 or 24 and controller 19 is also possible. Obviously, transmitters 12' and 23' are used to cooperate with the related receivers 34 and 36.

The control panel 19 includes DIP switches 25 for configuring predetermined flow rates of air in response to operation of the predetermined appliances 13 or 24. This permits correlation between a make up air volume relative to an exhaust air volume. The control panel 19 also includes necessary connections to microprocessor 26 for receiving input signals and sending an output signal to the make-up air apparatus 40 thereby facilitating adjustment of the air flow into the controlled building space 11.

Control panel 19 relays signals to the make-up air apparatus 40 whenever an exhaust appliance 13 or 24 within the building comes on. A speed control board with make-up air apparatus 40 receives the signal from the control panel 19. The make up air device 10 contains a variable speed motor 22 to regulate the amount of airflow to the building 11. Whenever a signal is received indicating that an appliance has been turned on the following control scenarios could occur:

I. No exhaust appliances previously on:
   control panel receives signal from appliance
   air flow requirements are determined
   back flow damper opens air temperature data monitored
preheater activated if required
motor speed defined, blower activated II. Additional exhaust appliance is activated:
control panel receives signal from appliance
air flow requirements are determined
motor speed defined, blower adjusted III. All exhaust appliances deactivated:
appliance input signals are deactivated
control panel issues shut down signal
blower and preheater shut down, back flow damper closes Regardless of which input methodology is used, the control system 10 is field adjustable, using the DIP switches 25 to configure the correct flow rate of each input appliance 13 or 24. This technique allows the make up air volume to closely match the exhaust air volume. Microprocessor 26 gathers all input signals and sends an output signal to the make-up air equipment allowing the correct amount of airflow into the building.

In FIG. 2 there is shown a situation where control system 10 is connected directly to an exhaust appliance. Control system 10, as shown in FIG. 2, for instance, has appliances 13 or 24 hard-wired to control panel 19. Within control panel 19 there are different configurations shown for the kitchen, bathrooms 1, 2 and 3 as the case may be. Microprocessor 26 is shown as well as the DIP switches 25. These are connected to the make up equipment 40 as is indicated by the wiring 20.

As shown in FIG. 3, the appliances 13 or 24 can be connected through a low voltage 24 volt AC or DC connector to the control panel 19 which has the same characteristics as the panels in FIG. 2.

In FIG. 4 there is shown a relationship where the operation appliances 13 and 24 is monitored by sensors 12 and 23. Information about the operation of these appliances is communicated through radio connected transmitter-receiver system 12'/34 or 23'/36. The different components including receivers 34 or 36 are part of panel 19. There is also shown a DIP switch 25 and microprocessor 26.

Figure 5:
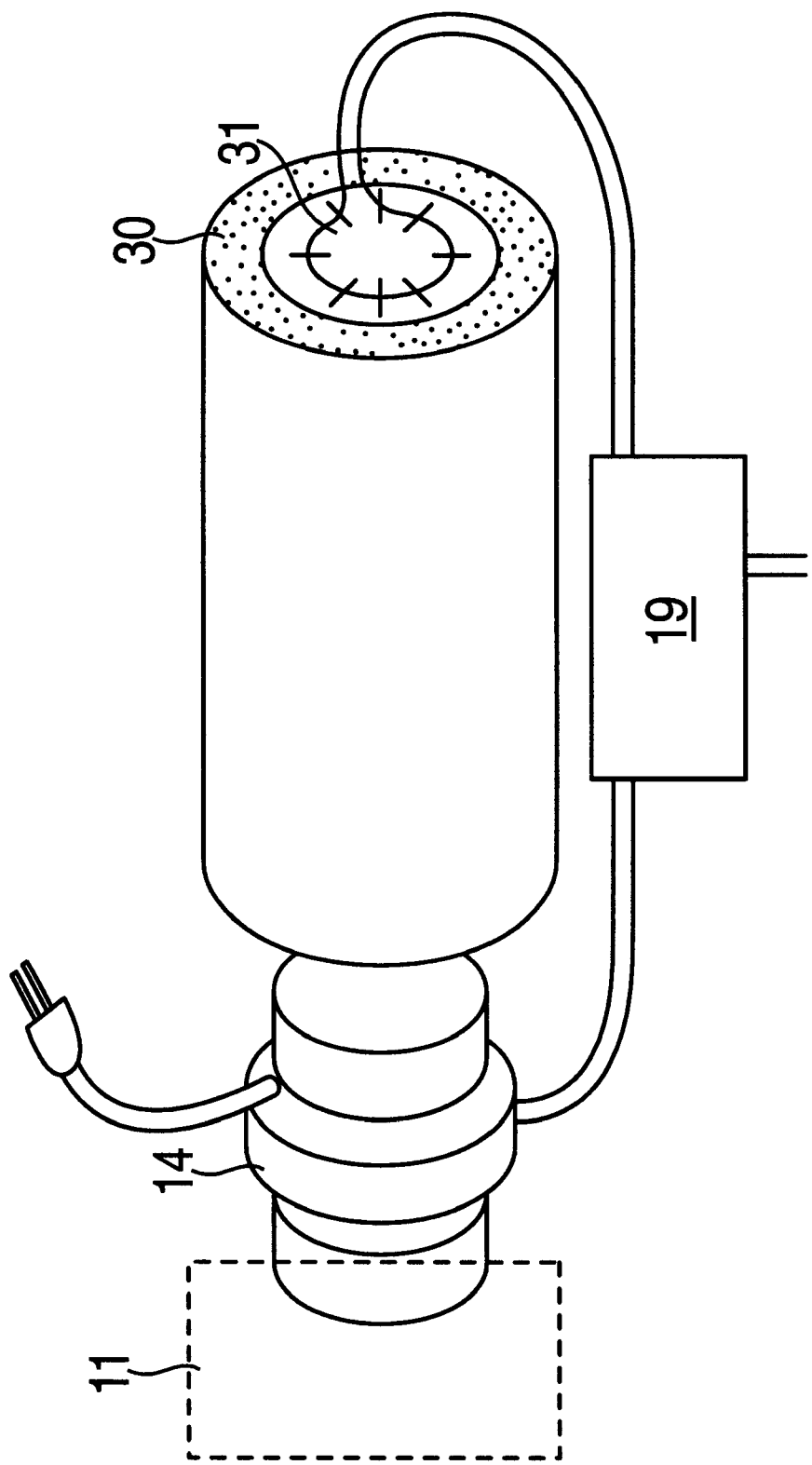
FIG. 5 is a representation of the make-up apparatus.

In FIG. 5 the system duct is shown which shows the arrangement of the invention. The control panel 19 as shown is connected to the insulated tube 30 within which is mounted the electrical front coil element 31. The blower 14 is shown in a position relative to the inside building space 11.

Other situations can exist wherein the panel includes a carbon monoxide detector which can be built into the panel or it can be a remote situation. This can be used to provide maximal supplemental air if appropriate. The temperature sensor can be built into the equipment. The motor is described as a variable speed motor but in different situations, can also be a single speed motor which is hard-wired into the system. The carbon monoxide detector can be wired to the control panel 19 as necessary.

The foregoing description of the preferred embodiments of the invention has been presented for the purposes of illustration and description. It is not intended to be exhaustive or to limit the invention to the precise form disclosed.

Many modifications and variations are possible in light of the above teaching. It is intended that the scope of the invention be limited not by this detailed description, but rather by the claims appended hereto.

What is claimed is:

1. A system for controlling make-up air within a controlled building space comprising:
a make-up air apparatus including a back-flow damper, a preheater, an air temperature sensor for monitoring the outside air temperature, a switch for activating the preheater in the event that the outside air temperature is below a predetermined level;
a power supply for activating a motor of the apparatus for a blower to draw air into the building space, the motor speed being determined in response to exhaust air operation;
a first sensor for sensing the operation of a first exhaust producing appliance within a building space;
a controller for the apparatus; and
a link for communicating a first signal to the controller indicating that the first appliance is activated, thus causing the controller to render the apparatus operational when the first appliance is activated.

2. A system as claimed in claim 1 including a second sensor associated with a second appliance, the controller receiving a second signal from the second sensor in accordance with the operational effect of air withdrawal associated with the second appliance.

3. A system as claimed in claim 1 including means for determining the motor speed and adjusting the blower thereby to regulate intake of air into the controlled building space.

4. A system as claimed in claim 2 including means for determining the motor speed and adjusting the blower thereby to regulate intake of air into the controlled building space.

5. A system as claimed in claim 1 wherein when an appliance is deactivated, a sensor associated with the appliance sends a signal to the controller to deactivate the blower and preheater and close a back-flow damper.

6. A system as claimed in claim 1 wherein the appliance is hardwired to the controller, such that the operation of the appliance directly signals the controller.

7. A system as claimed in claim 1 including a current sensor to determine the operational condition of the appliance, the sensor sending a signal to the controller.

8. A system as claimed in claim 1 including a wireless rf. sensor for transmitting signals between an appliance and the controller by a wireless link.

9. A system as claimed in claim 1 wherein the controller includes DIP switches for configuring predetermined flow rates of air in response to operation of the appliance thereby to permit correlation between a make up air volume relative to an exhaust air volume.

10. A system as claimed in claim 1 including a microprocessor in the controller for receiving input signals and sending an output signal to the apparatus thereby facilitating adjustment of the air flow into the building space.

11. A system as claimed in claim 1 wherein the apparatus includes a fan, heater and damper.

12. A system for controlling make-up air apparatus for a controlled building space comprising:
a first sensor for sensing the operation of a first appliance within a building space, the appliance, when operational, acting to cause air to be exhausted from the controlled building space,
a controller for the apparatus;
a link for communicating a first signal with the controller that the first appliance is activated, the link acting to render the apparatus operational when the first appliance is activated;
a device for determining the air flow requirements between the controlled building space and an environment outside of the controlled building space such as to ensure a predetermined balance of the pressure of air within the controlled building space and the environment outside of the controlled building space;

means for opening a back-flow damper associated with the apparatus; and a power supply for activating a motor of the apparatus for a blower to draw air into the building space, the motor speed being determined in response to the predetermined air flow of operational appliances.

13. A system as claimed in claim 12 including a second sensor associated with a second appliance, the controller receiving a second signal from the second sensor in accordance with the operational effect of air withdrawal associated with the second appliance.

14. A system for controlling make-up air apparatus for a controlled building space comprising:

a first sensor for sensing the operation of a first appliance within a building space, the appliance, when operational, acting to cause air to be exhausted from the controlled building space;

a controller for the apparatus;

a link for communicating a first signal with the controller that the first appliance is activated, the link acting to render the apparatus operational when the first appliance is activated;

a device for determining the air flow requirements between the controlled building space and an environment outside of the controlled building space such as to ensure a predetermined balance of the pressure of air within the controlled building space and the environment outside of the controlled building space;

means for opening a back-flow damper associated with the apparatus; and a power supply for activating a motor of the apparatus for a blower to draw air into the building space in response to the predetermined air flow of operational appliances.

15. A system as claimed in claim 1 including a second sensor associated with a second appliance, the controller receiving a second signal from the second sensor in accordance with the operational effect of air withdrawal associated with the second appliance.

16. A method for controlling make-up air apparatus for a controlled building space comprising:

sensing the operation of a first appliance within a building space, the appliance, when operational, acting to cause air to be exhausted from the controlled building space;

communicating a first signal that the first appliance is activated thereby to render the apparatus operational when the first appliance is activated;

determining the air flow requirements between the controlled building space and an environment outside of the controlled building space;

opening a back-flow damper associated with the apparatus;

monitoring the outside air temperature;

activating a heater in the event that the outside air temperature is below a predetermined level; and activating a blower in the apparatus to draw air into the building space, the motor speed being determined in response to appliance operation.

17. A method as claimed in claim 16 including sensing the operation of a second appliance, and transmitting a second signal with the operational effect of air withdrawal associated with the second appliance.

18. A method for controlling make-up air apparatus for a controlled building space comprising:

sensing the operation of a first appliance within a building space, the appliance, when operational, acting to cause air to be exhausted from the controlled building space;

communicating a first signal that the first appliance is activated thereby to render the apparatus operational when the first appliance is activated;

determining the air flow requirements between the controlled building space and an environment outside of the controlled building space;

opening a back-flow damper associated with the apparatus; and activating a blower in the apparatus to draw air into the building space in response to the airflow requirement.

19. A method as claimed in claim 18 including sensing the operation of a second appliance, and transmitting a second signal with the operational effect of air withdrawal associated with the second appliance.

* * * * *